United States Patent
Easwar

(10) Patent No.: US 7,176,976 B2
(45) Date of Patent: Feb. 13, 2007

(54) AUTOEXPOSURE METHODOLOGY IN A DIGITAL CAMERA

(75) Inventor: Venkat Easwar, Cupertino, CA (US)

(73) Assignee: Lightsurf Technologies, Inc., Santa Cruz, CA (US)

( * ) Notice: Subject to any disclaimer, the term of this patent is extended or adjusted under 35 U.S.C. 154(b) by 903 days.

(21) Appl. No.: 10/123,689

(22) Filed: Apr. 15, 2002

(65) Prior Publication Data

US 2003/0098914 A1 May 29, 2003

Related U.S. Application Data

(60) Provisional application No. 60/316,460, filed on Aug. 30, 2001.

(51) Int. Cl.
H04N 5/235 (2006.01)
G03B 7/00 (2006.01)

(52) U.S. Cl. .................. 348/362; 348/364; 348/229

(58) Field of Classification Search .......... 348/362, 348/333.01, 207, 221.1, 229.1, 364–366, 348/229, 222
See application file for complete search history.

(56) References Cited

U.S. PATENT DOCUMENTS 5,235,428 A * 8/1993 Hirota et al. ............... 348/355
6,486,915 B2 * 11/2002 Bell et al. .................. 348/362
6,630,960 B2 * 10/2003 Takahashi et al. .......... 348/364
6,970,198 B1 * 11/2005 Schinner et al. ........ 348/333.01

* cited by examiner

Primary Examiner—Vivek Srivastava
Assistant Examiner—Gevell Selby
(74) Attorney, Agent, or Firm—Blakely, Sokoloff, Taylor & Zafman, LLP; Judith A. Szepesi

(57) ABSTRACT

An improved method for automatic exposure control at a digital camera is described. In response to a user request for capture of a digital image, image data is captured on the camera's image sensor. The captured image data includes pixel values of brightness of pixels of the image sensor. A histogram of pixel values is generated based upon brightness of pixels of the image sensor. The histogram that is generated is then evaluated to determine whether an image is overexposed or underexposed. Coarse exposure settings for capture of a digital image are automatically generated based upon scaling the histogram of pixel values towards the midpoint of a pre-selected interval. The coarse exposure settings and image data that have been captured are evaluated to determine whether light sources are present. In the event that light sources are determined not to be present, the coarse exposure settings are adjusted based upon not scaling said histogram beyond the largest histogram value.

49 Claims, 9 Drawing Sheets

AUTOEXPOSURE METHODOLOGY IN A DIGITAL CAMERA

RELATED APPLICATIONS

The present application is related to and claims the benefit of priority of the following commonly-owned provisional application(s): application Ser. No. 60/316,460, filed Aug. 30, 2001, entitled "Improved Autoexposure Methodology in a Digital Camera", of which the present application is a non-provisional application thereof. The disclosure of the foregoing application is hereby incorporated by reference in its entirety, including any appendices or attachments thereof, for all purposes.

COMPUTER PROGRAM LISTING APPENDIX

This application includes a transmittal under 37 C.F.R. §1.52(e) of a Computer Program Listing Appendix comprising duplicate compact discs (2), respectively labeled "Copy 1" and "Copy 2". The discs are IBM-PC machine formatted and Microsoft® Windows Operating System compatible, and include identical copies of the following list of files:

| File Name | File Size (KB) | Created |
|---|---|---|
| ag_reg.h | 3.9 | 04/15/2002 12:00:00 PM |
| sensor.h | 11.4 | 04/15/2002 12:00:00 PM |
| sensor_ae.cpp | 46.1 | 04/15/2002 12:00:00 PM |
| sensor_ae.h | 13.8 | 04/15/2002 12:00:00 PM |
| sensor_ag_2000.cpp | 59.5 | 04/15/2002 12:00:00 PM |
| sensor_ag_2000.h | 13.6 | 04/15/2002 12:00:00 PM |

All of the material disclosed in the Computer Program Listing Appendix is hereby incorporated by reference into the present application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to improved techniques for automatic exposure control when capturing digital images.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanism and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid-state electronic device. The image sensor contains a grid of tiny photosites that convert light shining on them to electrical charges. The image sensor may be of the charged-coupled device (CCD) or complementary metal-oxide semiconductor (CMOS) varieties. Most digital cameras employ charge-coupled device (CCD) image sensors, but newer cameras are using image sensors of the complimentary metal-oxide semiconductor (CMOS) variety. Also referred to by the acronym CIS (for CMOS image sensors), this newer type of sensor is less expensive than its CCD counterpart and requires less power.

During camera operation, an image is focused through the camera lens so that it will fall on the image sensor. Depending on a given image, varying amounts of light hit each photosite, resulting in varying amounts of electrical charge at the photosites. These charges can then be measured and converted into digital information that indicates how much light hit each site which, in turn, can be used to recreate the image. When the exposure is completed, the sensor is much like a checkerboard, with different numbers of checkers (electrons) piled on each square (photosite). When the image is read off of the sensor, the stored electrons are converted to a series of analog charges which are then converted to digital values by an Analog-to-Digital (A-to-D) converter, which indicates how much light hit each site which, in turn, can be used to recreate the image.

As with conventional (i.e., non-digital) cameras, the exposure (i.e., the amount of light that reaches the image sensor) determines how light or dark the resulting photograph will be. When the shutter opens, light (reflected from the subject and focused by the lens) strikes the image sensor inside the camera. If too much light strikes the image sensor, the photograph will be overexposed. Overexposure may result in a washed out and faded looking picture. Too little light, on the other hand, produces an underexposed photograph that may be dark and lacking in details, especially in shadow areas. In conventional cameras, the amount of light that exposes the image is controlled by adjusting either the aperture (the size of the opening through which light enters the camera) or the shutter speed (the length of time light is allowed to enter). These adjustments may be made manually by the camera user or may be made by an automatic exposure mechanism of the camera which makes one or both of these adjustments for the user. Automatic exposure control (or autoexposure) is a feature desired by many camera users, particularly those that are not photography experts, as automatic exposure control enables users to take photographs without having to manually adjust the lens aperture and shutter speed (exposure time). Moreover, because autoexposure is a feature that has been available for a number of years on conventional film cameras, many users expect autoexposure to be provided as a standard feature of any digital camera they may purchase.

Automatic exposure control systems of traditional film cameras typically use light sensors and analog circuits to determine the correct exposure settings for image capture. As described above, an automatic exposure control system in a conventional camera automatically adjusts the aperture and shutter speed settings based upon the amount of light detected by a light sensor. After the system measures brightness (i.e., how light or dark the scene is), it calculates and sets the aperture and shutter speed of the camera to render this level of light as "middle gray" (i.e., the middle of a grayscale spectrum from white to black) in the photograph. If the amount of light is high, the aperture setting and/or shutter speed (exposure time) will be reduced. In darker conditions, the system will adjust the aperture setting and/or exposure time to be larger. Current digital cameras perform a similar process digitally by recording light signals on a sensor and applying an algorithm to the signal to establish the exposure settings. The sensor used may be the digital camera's main CMOS (or CCD) sensor itself or, alternatively, a separate light sensor included as part of the digital camera.

Although most current digital cameras use a separate light sensor for automatic exposure control, there are drawbacks to this approach. One drawback is cost. Use of an external light sensor adds another component to the camera that increases the overall cost of manufacture of the camera. In addition, a light sensor may also increase size of the camera and its power consumption. Both of these factors can be significant considerations, particularly for smaller cameras where size and power requirements are critical design considerations. For these reasons, an autoexposure approach that does not require a separate light sensor is preferred.

Another problem is that existing autoexposure systems typically rely on the use of a flash device for lower light conditions. However, use of a flash device also adds to the cost of manufacture of the camera as well as increasing its size and its power requirements. One would think with present-day digital technology and scale, one could create a digital camera that is extremely small and portable, particularly since a digital camera is not constrained by the physical constraints of traditional photographic film. This is not the case today, however. As it turns out, the whole process of capturing light and generating a color digital image, such as with a digital camera, is a very compute-intensive process. The process of recording an image on photographic film, in comparison, relies on straightforward chemical reactions, all without the need for computing resources. A digital image, however, entails a process of converting light into electrical signals, converting those electrical signals into digital or binary information, arranging that information into a visual representation, applying various digital filters and/or transformations, interpolating color from that representation, and so forth and so on. The process of rendering a meaningful digital picture is a compute-intensive undertaking, roughly equivalent in processing power to that required today for a desktop workstation, yet done so within the confines of a handheld portable device.

The upshot of this substantial processing requirement is that, paradoxically, digital cameras today are relatively bulky devices since they require relatively large batteries to support their processing needs. This is easily seen today in camera designs. Many digital camera designs employ either large custom lithium batteries or, alternatively four to six AA batteries. Even with these large battery arrangements, digital cameras today have relatively short battery lives, such that the digital camera user is required to change out batteries at frequent intervals. Perhaps the biggest drawback of such an approach, however, is the added bulk imparted to the camera itself with such a design. Today, most of the weight of a digital camera is attributable to its batteries. Thus, present-day digital cameras, being constrained by their battery requirements, are generally no smaller or portable than their non-digital counterparts (e.g., standard 35 mm film camera). And the smallest cameras today still remain film-based cameras, not digital ones, due in large part to the battery constraints of digital cameras.

Because of these size and power consumption considerations, an improved approach for automatic exposure control is needed that does not require a separate light sensor or a flash device for low light conditions. An autoexposure mechanism that uses the digital camera's image sensor and does not require the camera to be equipped with a flash device is required in order to enable the production of smaller, less expensive digital cameras. Avoiding the manufacturing costs and power consumption requirements of including a flash and external light sensor on a digital camera enables production of smaller, more portable cameras that are less expensive and have reduced battery requirements.

Current autoexposure systems which rely on using only the main (e.g., CMOS) image sensor of a digital camera may, however, have problems in properly capturing an image in low light conditions without using a flash. Without flash, a longer exposure (processing) time is required for darker scenes in order to avoid having an underexposed picture. This longer exposure time may result in a blurred picture as the camera or the subject may move while the image is still being processed. In low light settings the processing time required without flash may be impractical using current digital camera autoexposure methods. One possible approach to this problem is to pre-compute an exposure solution by periodically or constantly evaluating the light conditions to provide for quicker processing of a correct exposure solution. A drawback to this approach is that these continual calculations may result in considerable power consumption, thereby requiring larger batteries and/or more frequent battery changes or recharging.

Another problem with current autoexposure systems is that these systems often rely on spot metering in which only a small area in the middle of the image is evaluated. Rather than evaluating an entire image, this approach evaluates only specific spots or areas, typically a small area in the middle area of the image shown in the viewfinder. Spot metering may be problematic if, for instance, a dark object is located off center against a very light background. In this instance, the dark object may not be exposed properly because it is not located in the area the meter is emphasizing. Because only a portion of the scene is examined, other regions that are significantly lighter or darker may be underexposed when a spot metering technique is utilized. For these reasons an approach that examines the entire image is preferred as it more reliably handles a wider range of situations.

What is required is an improved automatic exposure control solution that meters all regions of an image to reliably handle a wide range of conditions, from low light, indoor scenes to outdoor, bright sun settings. This solution should not require the digital camera to be equipped with a flash or a separate light sensor, enabling its use in a wide range of devices, including small, inexpensive digital cameras in which cost, size and power consumption requirements are critical. Ideally, the solution should also enable automatic exposure control in digital cameras with a fixed lens aperture. The present invention provides a solution that fulfills these and other needs.

GLOSSARY

The following definitions are offered for purposes of illustration, not limitation, in order to assist with understanding the discussion that follows.

CCD: CCD is short for Charge-Coupled Device, an instrument whose semiconductors are connected so that the output of one serves as the input of the next. Until recent years, CCDs were the only image sensors used in digital cameras. Each CCD consists of hundreds of thousands of cells known as photosites or photodiodes. A Charge-Coupled Device (CCD) gets its name from the way the charges on its photosites (pixels) are read after an exposure. After the exposure the charges on the first row are transferred to a place on the sensor called the read out register. From there, the signals are fed to an amplifier and then on to an analog-to-digital converter. Once the row has been read, its charges on the readout register row are deleted, the next row enters, and all of the rows above march down one row. The charges on each row are "coupled" to those on the row above so when one moves down, the next moves down to fill its old space.

CMOS: CMOS is an abbreviation of Complementary Metal Oxide Semiconductor, a widely used type of semiconductor. CMOS image sensors, like CCD image sensors, capture light on a grid of small photosites on their surfaces, however they process images differently than CCDs and are manufactured using different techniques. CMOS semiconductors use both NMOS (negative polarity) and PMOS (positive polarity) circuits. Since only one of the circuit types is on at any given time, CMOS chips require less power than chips using just one type of transistor. This makes them particularly attractive for use in battery-powered devices, such as portable computers and digital cameras. Another advantage of CMOS semiconductors is that they may be manufactured using established high-yield techniques and, therefore, are significantly less expensive to fabricate than specialist CCDs. Furthermore, whilst CCDs have the single function of registering where light falls on each of the hundreds of thousands of sampling points, CMOS can be loaded with a host of other tasks, such as analog-to-digital conversion, load signal processing, and handling white balance and camera controls.

Photosites: Photosites or photodiodes are essentially light-collecting wells that convert optical information into an electric charge. When light particles known as photons enter the silicon body of the photosite, they provide enough energy for negatively charged electrons to be released. The more light that enters the photosite, the more free electrons are available. Each photosite has an electrical contact attached to it, and when a voltage is applied to this the silicon below each photosite becomes receptive to the freed electrons and acts as a container for them. Thus, each photosite has a particular charge associated with it—the greater the charge, the brighter the intensity of the associated pixel. The photosites on an image sensor actually respond only to light, not to color. Color is typically added to an image by means of red, green and blue filters placed over each pixel.

SUMMARY OF THE INVENTION

The present invention provides an improved method for automatic exposure control at a digital camera device. The method commences when a user requests capture of a digital image at a digital camera device. In response to a user request, image data is captured on the camera's image sensor. The image data that is captured includes values of brightness of pixels of the image sensor. Next, a profile of the distribution of these values of brightness is generated. In the currently preferred embodiment, the profile is a histogram that is generated based upon distribution of values of brightness in pre-selected ranges. The profile is then evaluated and initial exposure settings for capture of a digital image are automatically generated based upon scaling the distribution of these values of brightness towards the midpoint of a pre-selected interval.

The initial exposure settings and image data that have been captured are evaluated to determine whether areas of relative brightness (e.g., overhead lights) are present in the scene being captured. In the currently preferred embodiment, determining whether areas of relative brightness are present includes evaluating whether the number of pixels with high brightness values exceeds a pre-selected maximum, as well as determining whether the initial exposure settings exceed a pre-selected threshold. The initial exposure settings are adjusted based upon whether or not areas of relative brightness are determined to be present.

DETAILED DESCRIPTION OF A PREFERRED EMBODIMENT

The following description will focus on the currently-preferred embodiment of the present invention, which is implemented in a digital camera. The present invention is not, however, limited to any one particular application or any particular environment. Instead, those skilled in the art will find that the system and methods of the present invention may be advantageously employed on a variety of different devices. Therefore, the description of the exemplary embodiment that follows is for purpose of illustration and not limitation.

I. Digital Camera-based Implementation

A. Basic Components of Digital Camera

Figure 1:
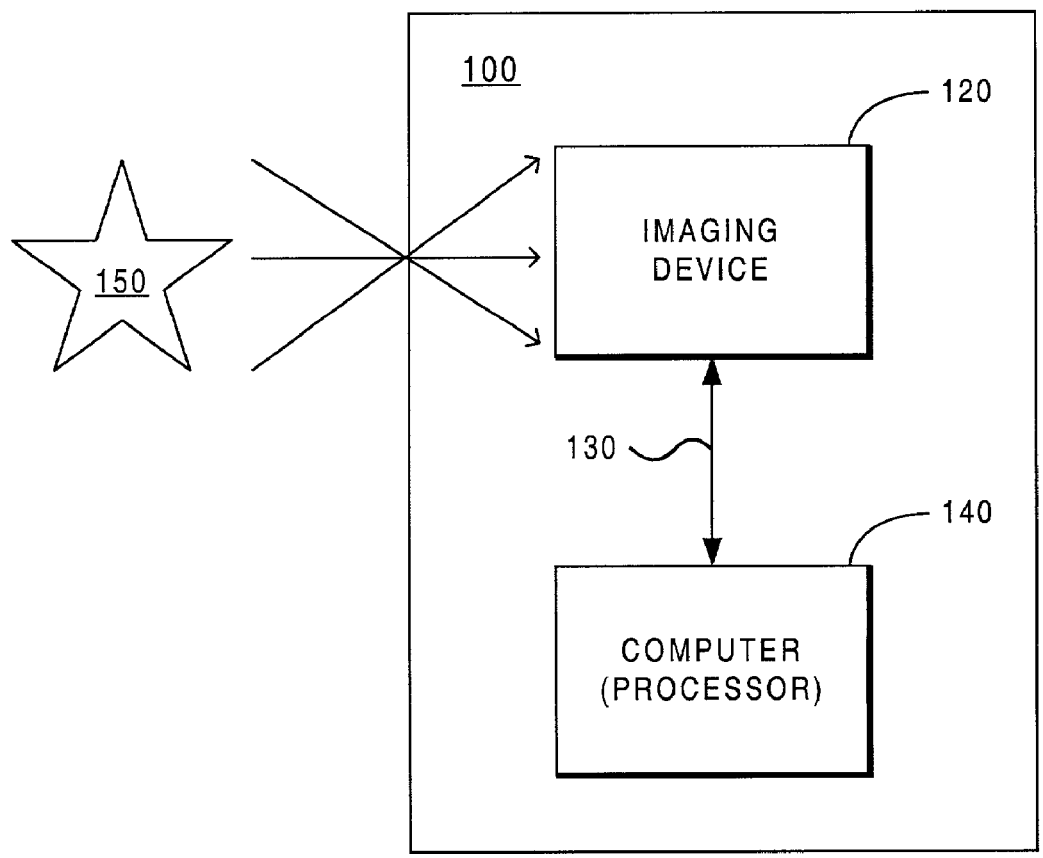
FIG. 1 is a very general block diagram of a digital camera suitable for implementing the present invention.

The present invention may be implemented on a media capturing and recording system, such as a digital camera. FIG. 1 is a very general block diagram of a digital camera 100 suitable for implementing the present invention. As shown, the digital camera 100 comprises an imaging device 120, a system bus 130, and a processor or computer 140 (e.g., microprocessor-based unit). Also shown is a subject or object 150 whose image is to be captured by the digital camera 100. The general operation of these components of the digital camera 100 in capturing an image of the object 150 will now be described.

As shown, the imaging device 120 is optically coupled to the object 150 in the sense that the device may capture an optical image of the object. Optical coupling may include use of optics, for example, such a lens assembly (not shown) to focus an image of the object 150 on the imaging device 120. The imaging device 120 in turn communicates with the computer 140, for example, via the system bus 130. The computer 140 provides overall control for the imaging device 120. In operation, the computer 140 controls the imaging device 120 by, in effect, telling it what to do and when. For instance, the computer 140 provides general input/output (I/O) control that allows one to coordinate control of the imaging device 120 with other electromechanical peripherals of the digital camera 100 (e.g., flash attachment).

Once a photographer or camera user has aimed the imaging device 120 at the object 150 (with or without user-operated focusing) and, using a capture button or some other means, instructed the camera 100 to capture an image of the object 150, the computer 140 commands the imaging device 120 via the system bus 130 to capture an image representing the object 150. The imaging device 120 operates, in essence, by capturing light reflected from the object 150 and transforming that light into image data. The captured image data is transferred over the system bus 130 to the computer 140 which performs various image processing functions on the image data before storing it in its internal memory. The system bus 130 also passes various status and control signals between the imaging device 120 and the computer 140. The components and operations of the imaging device 120 and the computer 140 will now be described in greater detail.

B. Image Capture on Imaging Device

Figure 2A:
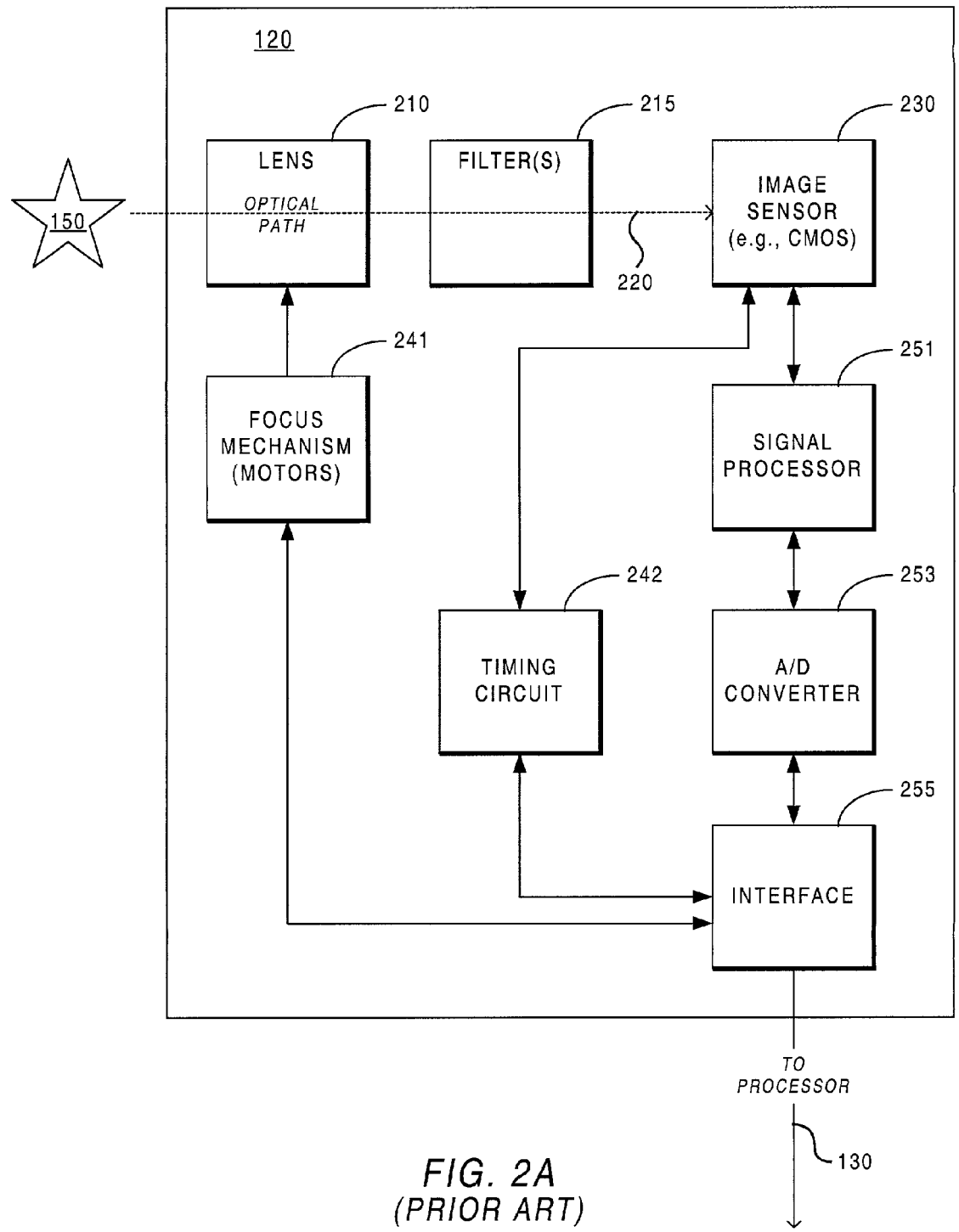
FIG. 2A is a block diagram of a conventional digital imaging device.

FIG. 2A is a block diagram of a conventional digital imaging device 120. As shown, the imaging device 120 comprises a lens 210 having an iris, one or more filter(s) 215, an image sensor 230 (e.g., CMOS, CCD, or the like), a focus mechanism (e.g., motors) 241, a timing circuit 242, a signal processor 251 (e.g., analog signal processor), an analog-to-digital (A/D) converter 253, and an interface 255. The operation of these components will now be described.

In operation, the imaging device 120 captures an image of the object 150 via reflected light impacting the image sensor 230 along optical path 220. The lens 210 includes optics to focus light from the object 150 along optical path 220 onto the image sensor 230. The focus mechanism 241 may be used to adjust the lens 210. The filter(s) 215 preferably include one or more color filters placed over the image sensor 230 to separate out the different color components of the light reflected by the object 150. For instance, the image sensor 230 may be covered by red, green, and blue filters, with such color filters intermingled across the image sensor in patterns ("mosaics") designed to yield sharper images and truer colors.

While a conventional camera exposes film to capture an image, a digital camera collects light on an image sensor (e.g., image sensor 230), a solid-state electronic device. The image sensor 230 may be implemented as either a charged-coupled device (CCD) or a complementary metal-oxide semiconductor (CMOS) sensor. Both CMOS and CCD image sensors operate by capturing light on a grid of small cells known as photosites (or photodiodes) on their surfaces. The surface of an image sensor typically consists of hundreds of thousands of photosites that convert light shining on them to electrical charges. Depending upon a given image, varying amounts of light hit each photosite, resulting in varying amounts of electrical charge at the photosites. These charges can then be measured and converted into digital information. A CCD sensor appropriate for inclusion in a digital camera is available from a number of vendors, including Eastman Kodak of Rochester, N.Y., Phillips of The Netherlands, and Sony of Japan. A suitable CMOS sensor is also available from a variety of vendors. Representative vendors include STMicroelectronics (formerly VSLI Vision Ltd.) of The Netherlands, Motorola of Schaumburg, Ill., and Intel of Santa Clara, Calif.

When instructed to capture an image of the object 150, the image sensor 230 responsively generates a set of raw image data (e.g., in CCD format for a CCD implementation) representing the captured object 150. In an embodiment using a CCD sensor, for example, the raw image data that is captured on the image sensor 230 is routed through the signal processor 251, the analog-to-digital (A/D) converter 253, and the interface 255. The interface 255 has outputs for controlling the signal processor 251, the focus mechanism 241, and the timing circuit 242. From the interface 255, the image data passes over the system bus 130 to the computer 140 as previously illustrated at FIG. 1. The operations of the computer 140 in processing this image data will now be described.

C. Image Processing

Figure 2B:
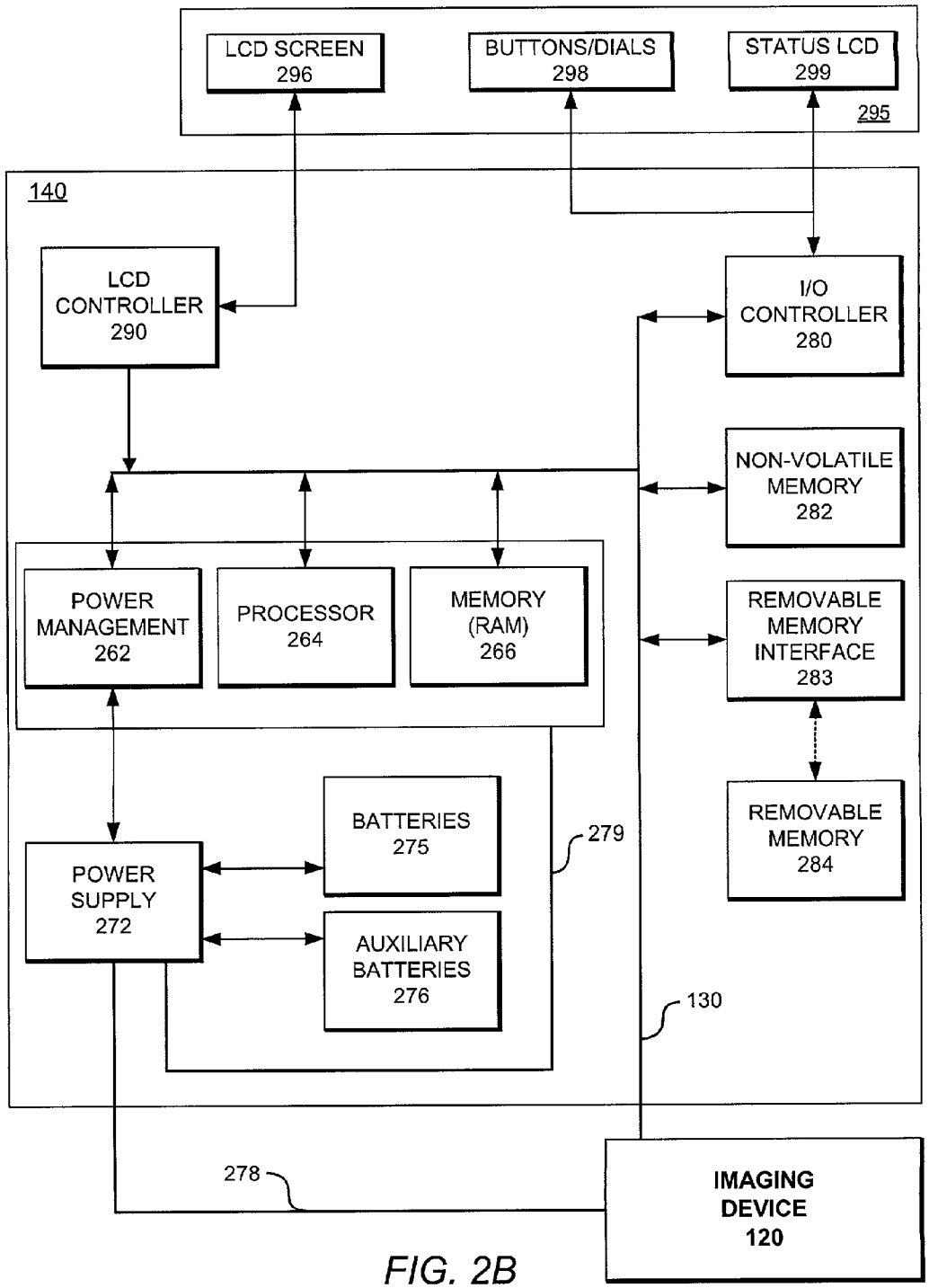
FIG. 2B is a block diagram of a conventional onboard processor or computer provided for directing the operation of the digital camera and processing image data.

A conventional onboard processor or computer 140 is provided for directing the operation of the digital camera 100 and processing image data captured on the imaging device 120. FIG. 2B is a block diagram of the processor or computer 140. As shown, the system bus 130 provides connection paths between the imaging device 120, an (optional) power management 262, a processor (CPU) 264, a random-access memory (RAM) 266, an input/output (I/O) controller 280, a non-volatile memory 282, a removable memory interface 283, and a liquid crystal display (LCD) controller 290. Removable memory 284 connects to the system bus 130 via the removable memory interface 283. Alternately, the camera 100 (and therefore the onboard computer 140) may be implemented without the removable memory 284 or the removable memory interface 283. The power management 262 communicates with the power supply 272. Also illustrated at FIG. 2B is a camera user interface 295 which is electrically connected to the LCD controller 290 and the input/output controller 280. Each of these components will now be described in more detail.

The processor (CPU) 264 typically includes a conventional processor device (e.g., microprocessor) for controlling the operation of camera 100. Implementation of the processor 264 may be accomplished in a variety of different ways. For instance, the processor 264 may be implemented as a microprocessor (e.g., MPC823 microprocessor, available from Motorola of Schaumburg, Ill.) with DSP (digital signal processing) logic blocks, memory control logic blocks, video control logic blocks, and interface logic. Alternatively, the processor 264 may be implemented as a "camera on a chip (set)" using, for instance, a Raptor II chipset (available from Conexant Systems, Inc. of Newport Beach, Calif.), a Sound Vision Clarity 2, 3, or 4 chipset (available from Sound Vision, Inc. of Wayland, Mass.), or similar chipset that integrates a processing core with image processing periphery. Processor 264 is typically capable of concurrently running multiple software routines to control the various processes of camera 100 within a multithreaded environment.

The digital camera 100 includes several memory components. The memory (RAM) 266 is a contiguous block of dynamic memory which may be selectively allocated to various storage functions. Dynamic random-access memory is available from a variety of vendors, including, for instance, Toshiba of Japan, Micron Technology of Boise, Id., Hitachi of Japan, and Samsung Electronics of South Korea. The non-volatile memory 282, which may typically comprise a conventional read-only memory or flash memory, stores a set of computer-readable program instructions to control the operation of the camera 100. The removable memory 284 serves as an additional image data storage area and may include a non-volatile device, readily removable and replaceable by a camera 100 user via the removable memory interface 283. Thus, a user who possesses several removable memories 284 may replace a full removable memory 284 with an empty removable memory 284 to effectively expand the picture-taking capacity of the camera 100. The removable memory 284 is typically implemented using a flash disk. Available vendors for flash memory include, for example, SanDisk Corporation of Sunnyvale, Calif. and Sony of Japan. Those skilled in the art will appreciate that the digital camera 100 may incorporate other memory configurations and designs that readily accommodate the image capture and processing methodology of the present invention.

The digital camera 100 also typically includes several interfaces for communication with a camera user or with other systems and devices. For example, the I/O controller 280 is an interface device allowing communications to and from the computer 140. The I/O controller 280 permits an external host computer (not shown) to connect to and communicate with the computer 140. As shown, the I/O controller 280 also interfaces with a plurality of buttons and/or dials 298, and an optional status LCD 299, which in addition to the LCD screen 296 are the hardware elements of the user interface 295 of the device. The digital camera 100 may include the user interface 295 for providing feedback to, and receiving input from, a camera user, for example. Alternatively, these elements may be provided through a host device (e.g., personal digital assistant) for a media capture device implemented as a client to a host device. For an embodiment that does not need to interact with users, such as a surveillance camera, the foregoing user interface components may not be required. The LCD controller 290 accesses the memory (RAM) 266 and transfers processed image data to the LCD screen 296 for display. Although the user interface 295 includes an LCD screen 296, an optical viewfinder or direct view display may be used in addition to or in lieu of the LCD screen to provide feedback to a camera user. Components of the user interface 295 are available from a variety of vendors. Examples include Sharp, Toshiba, and Citizen Electronics of Japan, Samsung Electronics of South Korea, and Hewlett-Packard of Palo Alto, Calif.

The power management 262 communicates with the power supply 272 and coordinates power management operations for the camera 100. The power supply 272 supplies operating power to the various components of the camera 100. In a typical configuration, power supply 272 provides operating power to a main power bus 278 and also to a secondary power bus 279. The main power bus 278 provides power to the imaging device 120, the I/O controller 280, the non-volatile memory 282, and the removable memory 284. The secondary power bus 279 provides power to the power management 262, the processor 264, and the memory (RAM) 266. The power supply 272 is connected to batteries 275 and also to auxiliary batteries 276. A camera user may also connect the power supply 272 to an external power source, as desired. During normal operation of the power supply 272, the main batteries 275 provide operating power to the power supply 272 which then provides the operating power to the camera 100 via both the main power bus 278 and the secondary power bus 279. During a power failure mode in which the main batteries 275 have failed (e.g., when their output voltage has fallen below a minimum operational voltage level), the auxiliary batteries 276 provide operating power to the power supply 276. In a typical configuration, the power supply 272 provides power from the auxiliary batteries 276 only to the secondary power bus 279 of the camera 100.

The above-described system 100 is presented for purposes of illustrating the basic hardware underlying a media capturing and recording system (e.g., digital camera) that may be employed for implementing the present invention. The present invention, however, is not limited to just digital camera devices but, instead, may be advantageously applied to a variety of devices capable of supporting and/or benefiting from the methodologies of the present invention presented in detail below.

II. Improved Method for Automatic Exposure Control in a Digital Camera

A. Overview

Automatic exposure control or "autoexposure" is the process used by a camera to adjust its internal exposure parameters to achieve correct picture exposure. Current autoexposure methods in digital cameras use one of two general approaches to measure brightness. The first approach uses light sensors to measure ambient light and accordingly adjust internal image sensor parameters to achieve correct exposure for the measured brightness. The second approach uses the camera's image sensor itself in an iterative process to achieve proper exposure of an image. Using the camera's image sensor for automatic exposure control avoids the additional cost and expense of utilizing an external light sensor to measure brightness. In either case, both types of automatic exposure control systems algorithmically determine the correct parameters for optimal "pixel exposure" of pixels of the image sensor of a digital camera.

The "pixel exposure" of pixels of the image sensor in a digital camera is influenced by several variables. First, variations in the aperture of the lens can influence exposure, as pixel exposure is directly proportional to the area of the aperture. A second variable is exposure time. The longer the exposure time, the greater the exposure value accumulated at each pixel of the image sensor. Thus, pixel exposure is also directly proportional to the exposure time. A third variable typical in digital cameras is a sensor analog gain parameter. Existing autoexposure methods typically use analog amplifiers, usually one per color channel, on the image sensor of a digital camera in order to boost the detected exposure. This sensor analog gain (or amplification) may be applied uniformly to all pixels as "pseudo" exposure control to boost the signal, although in reality analog gain does not affect the light actually accumulated at a sensor pixel. Nonetheless, sensor gain is quite useful for automatic exposure control. When an image is underexposed, amplification enables boosting of the detected exposure. This boosting of the image before quantization also enables the "background noise" in the resulting image to be reduced.

The autoexposure method of the present invention uses a coarse-to-fine strategy for exposure control. Initially, a fast, coarse search is used to roughly determine the parameters needed for a reasonable exposure. In this coarse phase, captured sensor image data is mapped into a histogram (i.e., profiled) to evaluate the distribution of pixels with high (i.e., bright or saturated) and low (i.e., dark) pixel values. Based upon evaluation of this histogram, the exposure settings are adjusted so that the captured image is not underexposed or overexposed. In the currently preferred embodiment, this includes adjusting exposure time and sensor gain in order to scale the captured pixel values towards the middle of the range represented by the histogram based upon pre-selected preferred levels. Next, a fine computation is used to detect whether or not areas of relative brightness, such as overhead lights or other light sources, are present. Based upon this evaluation, adjustments are made to the coarse exposure settings to determine the final exposure parameters. The exposure settings resulting from these coarse and fine computations may then be utilized for final exposure of an image.

The present solution has several advantages. First, because the method is fast, it suffices to execute it after the shutter button of the camera is pressed to take a picture. There is no need to continuously run the sensor (and make the associated autoexposure calculations) which would lead to significant power consumption and a drain on the battery. Second, the methodology of the present invention uses the image sensor of a digital camera and does not require a separate external light sensor or a flash attachment. Thus, the present approach is appropriate for devices having limited power resources, including small, portable cameras as well as camera modules embedded in mobile devices such as handheld computers, personal digital assistants, or the like. Furthermore, in its presently preferred embodiment, the autoexposure method of the present invention controls exposure by adjusting exposure time and sensor gain. This enables the method to be used in a digital camera having a lens with a fixed aperture, thereby avoiding the costs (both manufacturing costs and power consumption requirements) inherent in utilizing a motor to control lens aperture. However, those skilled in the art will appreciate that the methodology of the present invention may also be used in a camera having an adjustable lens aperture and/or a flash attachment.

B. Block Diagram of Automatic Exposure Control System

Figure 3:
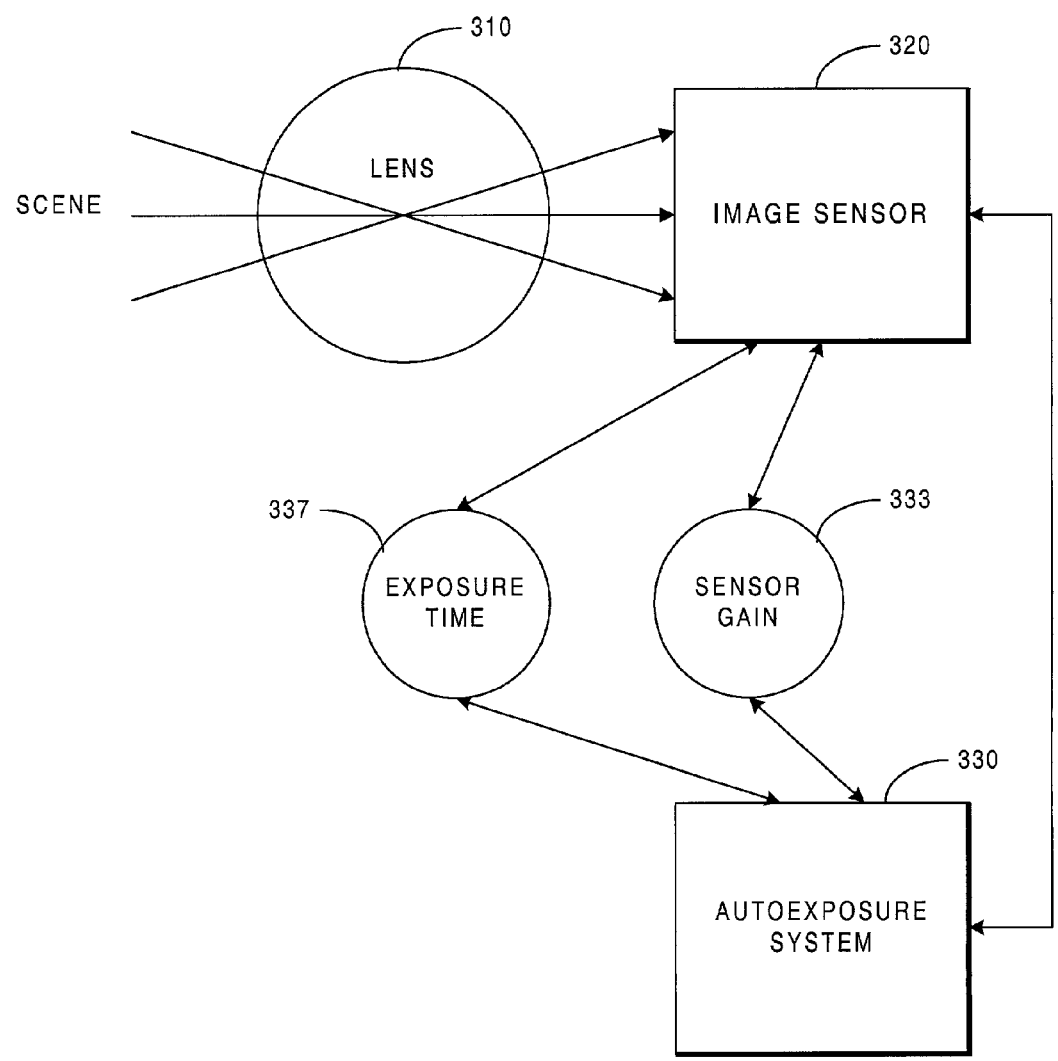
FIG. 3 is a high-level block diagram of an automatic exposure control system constructed in accordance with the present invention.

FIG. 3 is a high-level block diagram of an automatic exposure control system constructed in accordance with the present invention. As shown, incoming light from a scene is focused through a lens 310 onto an image sensor 320. Image data captured on the image sensor 320 is passed to an autoexposure (automatic exposure control) system 330 for evaluation and feedback. The autoexposure system 330 initially performs a fast and quick evaluation in a "coarse" phase of the present method. This coarse phase is an iterative process which enables a rough exposure solution to be generated. Based upon the results of the coarse phase, the autoexposure system 330 may adjust the exposure time 337 and/or sensor gain 333 to enable capture of an image that will not be overexposed or underexposed. The image data initially captured may then be discarded. In the "fine" phase of the method, additional computations are made by the autoexposure system 330 in an effort to optimize the exposure settings for capture of image data based upon whether or not areas of relative brightness, such as overhead light sources, are detected in a scene. Based upon the results of this fine phase of evaluation, additional adjustments may be made to exposure time 333 and sensor gain 337 for optimal exposure of the image from this scene. The coarse and fine portions of the improved autoexposure method of the present invention will now be described in greater detail.

C. Overview of Coarse Phase of Autoexposure Process

The coarse phase of the autoexposure method of the present invention is a fast and iterative process for roughly determining the exposure parameters that should be used to capture an image. In this phase, rough image data is captured and quickly evaluated to determine whether the image is overexposed or underexposed. An overexposed image with a large number of over saturated pixels is very difficult to adjust mathematically as over saturation results in loss of information about the scene being captured. On the other hand, if an image is underexposed, then the information that is available about the scene may be insufficient to generate a reasonable result. Accordingly, quickly evaluating whether an image is at one end of the spectrum (e.g., very bright) or the other (e.g., very dark) enables the correct amount of information to be gathered to generate a better final result in the fine phase of the process. By quickly evaluating the image in the coarse phase, an exposure time can be determined to enable capture of a reasonable image. This can then be fine tuned in the fine portion of the process. The computations made during the coarse phase of the present method will now be described.

D. Computations Made During Coarse Phase

Figure 4:
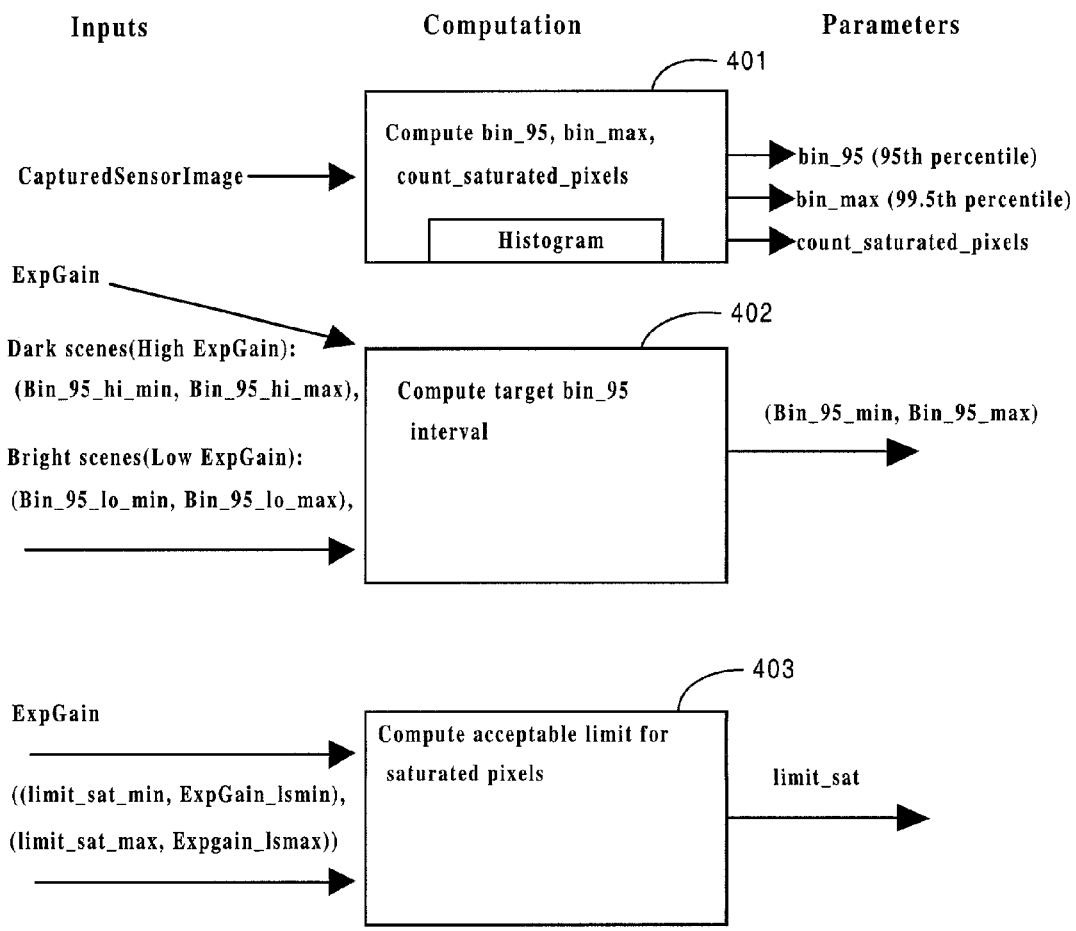
FIG. 4 is a diagram illustrating three sets of parameter computations made during the first or "coarse" phase of the autoexposure method of the present invention.

FIG. 4 is a diagram illustrating the three sets of parameter computations made during each iteration of the "coarse" phase of the autoexposure method of the present invention. As shown at FIG. 4, the coarse phase of the method starts with capture of an image using the current exposure time and sensor gain (referred to hereinafter together as "ExpGain" or ExpGain) settings. ExpGain is the product of exposure time and sensor gain for an image which determines its exposure. In the coarse phase of the method, the sensor gain component of ExpGain is generally larger than in typical final exposure, as the purpose of the coarse phase is to quickly generate a rough result. A shorter exposure time is required during the coarse phase so that image capture is not delayed. A lengthy exposure time is avoided as it might result in a blurred image if, for example, the subjects of the photograph moved while the exposure settings are being calculated. The exposure time and sensor gain settings used during coarse autoexposure are described in more detail below.

As shown in box 401 at the top of FIG. 4, using raw captured sensor image data as input, a histogram is generated and certain parameters, including Bin_95 (95th percentile) and Bin_max (99th percentile) are calculated. These parameters and their calculation are described in greater detail below. The histogram that is generated is an array that stores counts of pixel values that fall into particular ranges. For example, assume that a particular digital camera has an 8-bit, VGA 640×480 sensor with a total of 307,200 pixels.

In this situation, pixels having the range of legal values 0–255, may be distributed into a number of different subgroups or "bins" for purposes of mapping the values to a histogram. For example, 256 values (0–255) may be mapped into a total of 32 bins (bin 0 to bin 31). Bin 0 would count all pixels that fall in the range from 0 to 7, bin 1 would count all pixels that fall into the range 8 to 15, and so forth. The final bin (bin 31) would count all pixels in the range from 248 to 255. The histogram provides a useful way of representing the captured pixel values and evaluating whether an image is overexposed or underexposed. For example, if a large portion of the values were at the high end of the range (e.g., in bins 28, 29, 30, and 31), the image is likely to be overexposed (over saturated). Similarly, if almost all of the values are at the low end of the ranges (e.g., bins 0, 1, 2, and 3) the image is likely to be underexposed. Accordingly, the coarse phase of the autoexposure method of the present invention evaluates whether the captured sensor image is at one of these extremes so that appropriate adjustments may be made before image capture. In particular, this evaluation includes computation of certain parameters about the histogram, including cumulative percentiles Bin_95 and Bin_max.

Bin_95 is defined as the bin of the histogram for which the cumulative count of pixels equals (or just exceeds) 95 percent of the total number of pixels. Bin_95 is calculated by counting the total number of pixels in each bin, starting with bin 0. For example, if pixels are counted starting with those in bin 0, followed by those in bin 1, and so forth, then the bin for which the cumulative count of pixels just exceeds 95 percent of the total number of pixels will correspond to Bin_95. Bin_max is calculated in the same manner as bin 95, except that the cumulative percentile used for Bin_max is 99.5 percent of the total number of pixels. The number of saturated pixels is also counted as part of these calculations and the result of this count is retained as the count_saturated_pixels parameter as shown at FIG. 4.

Next, as shown in box 402 in the middle of FIG. 4, an appropriate target range in which Bin_95 should be located is determined. This target range, referred to as the target bin_95 interval is intended to ensure that the image is neither overexposed nor underexposed. The applicable target range for a particular scene is determined by taking the ExpGain (i.e., the product of exposure and sensor gain) of the captured image as input and comparing it to a threshold. One of two pre-selected ranges is used based upon whether ExpGain is greater than or less than this threshold. A lower range (Bin_95_lo_min, Bin_95_lo_max) is used for bright scenes (Low ExpGain). A higher range is used for dark scenes (High ExpGain). The appropriate legal range for the target bin_95 interval (Bin$_{13}$ 95_min, Bin_95_max) is generated as shown at FIG. 4.

A limit for saturated pixels is then determined based upon whether the scene has a lower or higher ExpGain product. In other words, a determination is made of how much saturation to allow. More saturation is allowed in low light scenes which have larger ExpGain products, as these are typically indoor scenes with overhead lights causing saturation in certain areas of the image. Less saturation is allowed in brighter scenes with lower ExpGain products, such as outdoor, daytime scenes. Based upon the current ExpGain product and pre-determined limits for low ExpGain(limit_sat_min, ExpGain_lsmin) and higher ExpGain (limit_sat_max, ExpGain_lsmax), the saturation limit (limit_sat) for the image is determined as shown in box 403 at FIG. 4. The application and use of the above-described parameters during iterations of the coarse phase of the autoexposure method of the present invention will now be described.

E. Detailed Method Steps of Coarse Phase of Autoexposure Method

Figure 5:
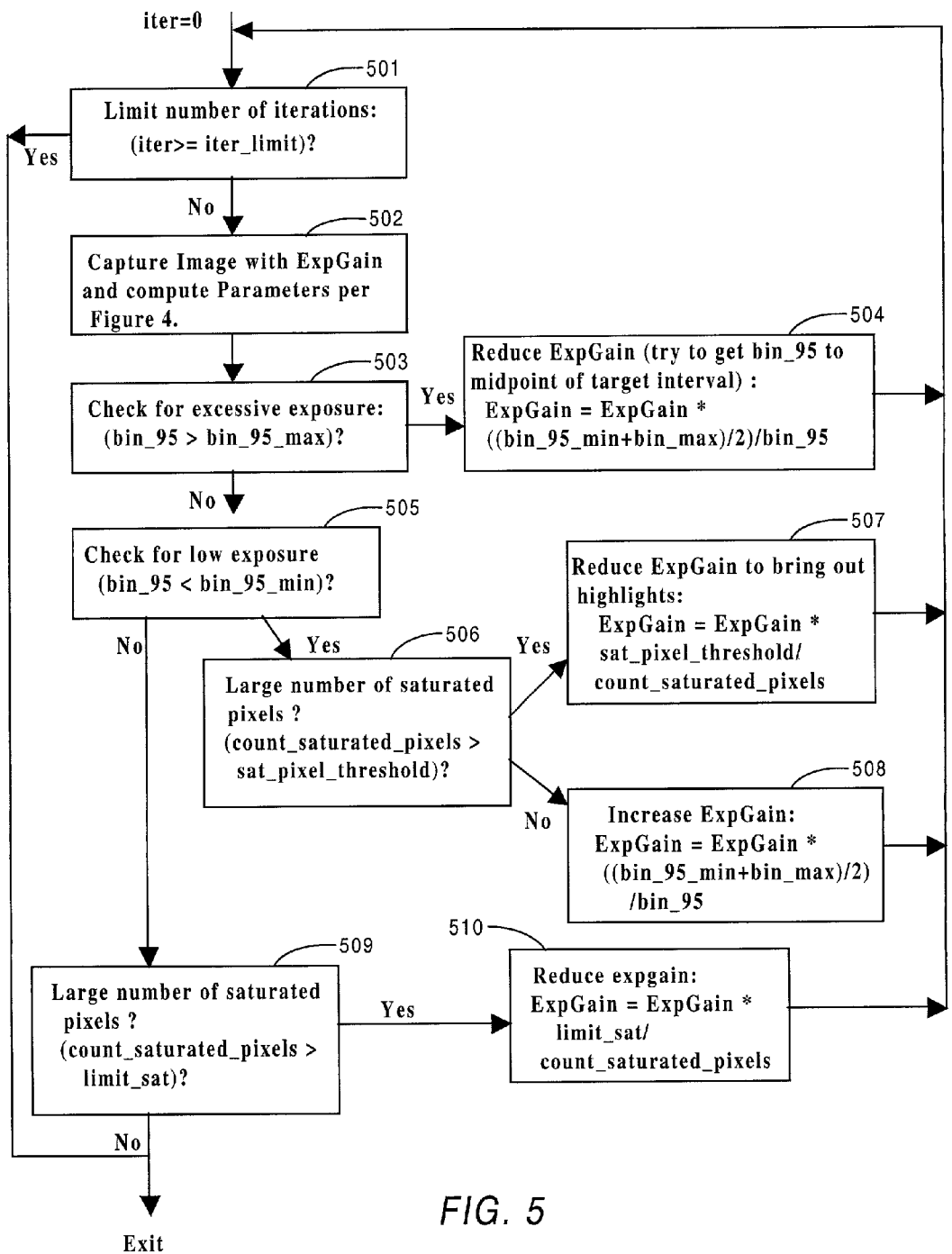
FIG. 5 is a flow diagram illustrating the detailed method steps of the coarse phase of the autoexposure method of the present invention.

FIG. 5 is a flow diagram illustrating the detailed method steps of the coarse phase of the autoexposure method of the present invention. As described above, the coarse phase is an iterative process to determine rough exposure settings for capture of an image. Image data may be captured by the image sensor and evaluated by the autoexposure system several times before reasonable coarse exposure settings are determined. Accordingly, at step 501, the method commences with an evaluation as to whether the number of iterations exceeds a pre-selected maximum. As the method commences after a camera user has issued a command (e.g., pressed the button on the camera) to take a picture, there is only a limited amount of time available to determine exposure settings appropriate for image capture. Accordingly, if the number of iterations exceeds the pre-selected maximum, the coarse phase of the automatic exposure method is terminated. In the event of termination as a result of exceeding the maximum number of iterations, the method may proceed to the fine exposure phase using the current exposure settings. An error message or signal may also be displayed to the user in conjunction with the capture of an image. In the currently preferred embodiment, this error message or signal may be displayed to the user as a warning that the image that is being captured may be overexposed or underexposed. In an alternative embodiment, an error message is displayed to the user in lieu of capturing an image.

At step 502, image data is captured on the image sensor using current ExpGain settings. The ExpGain settings used may be an initial setting or may result from feedback from a prior iteration. In the currently preferred embodiment, initial ExpGain settings are pre-selected settings that are automatically applied by the autoexposure system. In an alternative embodiment, ExpGain settings used for final exposure of an image are stored in cache memory. In this alternative embodiment, the initial ExpGain settings used by the autoexposure system in the coarse phase of the method are based upon the stored ExpGain settings used for the most recent picture taken by the camera. In either case, after image data has been captured, a histogram is generated and several parameters, including Bin_95 and Bin_max, are calculated as described above. A count of the number of saturated pixels is also made at step 502. The parameters computed may then be evaluated in the following steps to establish rough exposure settings for capture of the image.

A check for overexposure is made at step 503. The Bin_95 parameter computed in step 502 is compared to a maximum limitation (bin_95_max). Recall that bin_95_max is selected from a higher range or a lower range based upon the current ExpGain settings used to capture the image. If Bin_95 is less than or equal to the maximum limitation (bin_95_max), the method proceeds to step 505. Otherwise, if Bin_95 exceeds this limitation, the exposure is excessive and the method proceeds instead to step 504. At step 504, the ExpGain product is adjusted (reduced) in an effort to scale Bin_95 of the histogram towards the midpoint of the target interval. The adjusted ExpGain product is calculated by multiplying the current ExpGain product by a sum equal to the following: (bin_95_min + bin_95_max/2)/Bin_95. After adjustment of the ExpGain product, steps 501 to 503 are repeated, including capture of additional image data using the adjusted settings.

If Bin_95 is less than or equal to the maximum limitation at step 503, then the image is not overexposed and the method proceeds to step 505. At step 505 a check is made for underexposure. If Bin_95 is greater than (or equal to) the minimum limitation (bin_95_min), then the image is not underexposed and the method proceeds to step 509. However, if Bin_95 is less than the minimum (bin_95_min), the method instead proceeds to step 506 and either step 507 or 508. Step 506 checks to determine if an underexposed image contains a large number of saturated pixels. Specifically, the count of saturated pixels in the image (count_saturated_pixels) is compared to a threshold (sat_pixel_threshold). If the count of saturated pixels is greater than the threshold, then the method proceeds to step 507 to reduce ExpGain as a significant portion of the image is over saturated. In this situation, ExpGain is reduced in order to bring out the highlights in the image. As shown, ExpGain is adjusted by multiplying the current ExpGain setting by a fraction, the numerator of which is the saturated picture threshold and denominator of which is the number of saturated pixels in the image. The method then loops back to step 501 based on the adjusted ExpGain setting.

If the number of saturated pixels does not exceed the threshold at step 506, the method proceeds to step 508 to increase ExpGain. The ExpGain value is adjusted in order to move Bin_95 of the histogram to the midpoint of the preferred interval. As shown at step 508, the adjusted ExpGain product is calculated by multiplying the current ExpGain value by a sum equal to the following: (bin_95_min + bin_95_max/2)/Bin_95. Observe that formula is the same formula that is used to decrease ExpGain when an image is overexposed. However, in this instance of underexposure, the same formula serves to increase ExpGain. In either case, the method attempts to scale the histogram (representing brightness of pixels of the image) from either end of the range (overexposed or underexposed) toward the middle of the range to enable capture of an appropriate amount of image data. After the ExpGain setting is adjusted, the method loops back stating with step 501, and image data is captured using the new setting.

If the check at step 503 verifies that an image is not overexposed, and step 505 verifies that it is not underexposed, the method proceeds to step 509. This step evaluates whether the image contains a large number of saturated pixels. The number of saturated pixels in the image (count_saturated_pixels) is compared to the saturation limit. Recall from FIG. 4 that a saturation limit is selected from a lower range or a higher range based upon whether the current ExpGain product is higher or lower. In the event that the number of saturated pixels exceeds the saturation limit, the method proceeds to step 510 to reduce ExpGain. As shown at step 510, the ExpGain setting is reduced by multiplying the current ExpGain setting by the saturation limit (limit_sat) and dividing it by the count of saturated pixels (count_saturated_pixels). The method then again loops through the prior steps commencing with step 501. On the other hand, if the image is not found to be over saturated at step 509 (i.e., if the number of saturated pixels is less than the maximum), the coarse phase terminates and the second phase of the autoexposure measure of the present invention commences.

F. Fine Phase of Autoexposure Method

As described above, the coarse (or first) phase of the method only determines an adequate exposure by attempting to adjust the exposure time and sensor gain settings (ExpGain) so that an image is not overexposed or underexposed. Any image data captured during the coarse phase is discarded and the second or fine phase of the automatic exposure control method of the present invention attempts to determine a final exposure settings that will be used to capture a particular image. In determining final exposure settings to be used to capture an image, the fine phase tries to distinguish between exposures with areas of relative brightness (e.g., overhead lights) and those without such areas of relative brightness. When light sources, such as overhead light fixtures or street lamps, are not present in a scene, it is important to preserve the highlights in the scene. However, when such light sources are not present in a scene, it is equally important to capture an image that is sufficiently bright. Accordingly, the fine phase involves several calculations to detect areas of relative brightness, which may indicate the presence of overhead lights or other light sources. Based upon these fine computations, the final exposure settings to be used for capturing and storing an image are determined.

The parameters in the following table are evaluated as part of the fine phase of automatic exposure control:

| Parameter | Description | Example values |
|---|---|---|
| Bin_95 | The 95$^{th}$ percentile bin | 12 |
| Target_95 | The target bin for the 95$^{th}$ percentile point | 20 |
| Scale_95 | ExpGain Scale factor to get to Target_95 = Target_95/Bin_95 | 20/12 = 1.667 |
| Bin_max | 99.5$^{th}$ percentile | 15 |
| Target_max | The target bin for the 99.5$^{th}$ percentile point. | 28 |
| Scale_max | ExpGain Scale factor to get to Target_max = Target_max/Bin_max | 28/15 = 1.867 |
| Scale | Max(Scale_95, Scale_max) | 1.867 |
| ExpGain_threshold | Threshold to assist in determining "no light sources in scene" vs. "lights sources in scene" | 50000 |
| ExpGain | The Exposure Gain product value from coarse autoexposure | 20000 |
| MaxTo95_threshold | If ratio of Bin_max to Bin_95 is larger than this threshold it is likely that the scene has light sources | 2.0 |
| Sat_threshold | If the count of saturated pixels is larger than this number, it is likely that there are light sources in the scene. | 10000 |
| Hist_Bins | Number of bins in the histogram | 32 |

As shown above, the Bin_95 and Bin_max values from the coarse phase of the autoexposure method of the present invention are compared to pre-selected targets (Target_95, Target_max) and two parameters (Scale_95, Scale_max) are calculated as the ratios of the target values to the values in the current image. Examples of calculated Scale values (Scale, Scale_95, Scale_max) and other parameters for an exemplary exposure are shown in the third column of the above table to illustrate these fine computations. Based upon the computations made during this fine phase, an appropriate ratio for scaling (i.e., adjusting) the ExpGain setting established during the coarse phase is determined in the manner described below.

G. Detailed Method Steps of Fine Phase of Autoexposure Method

Figure 6:
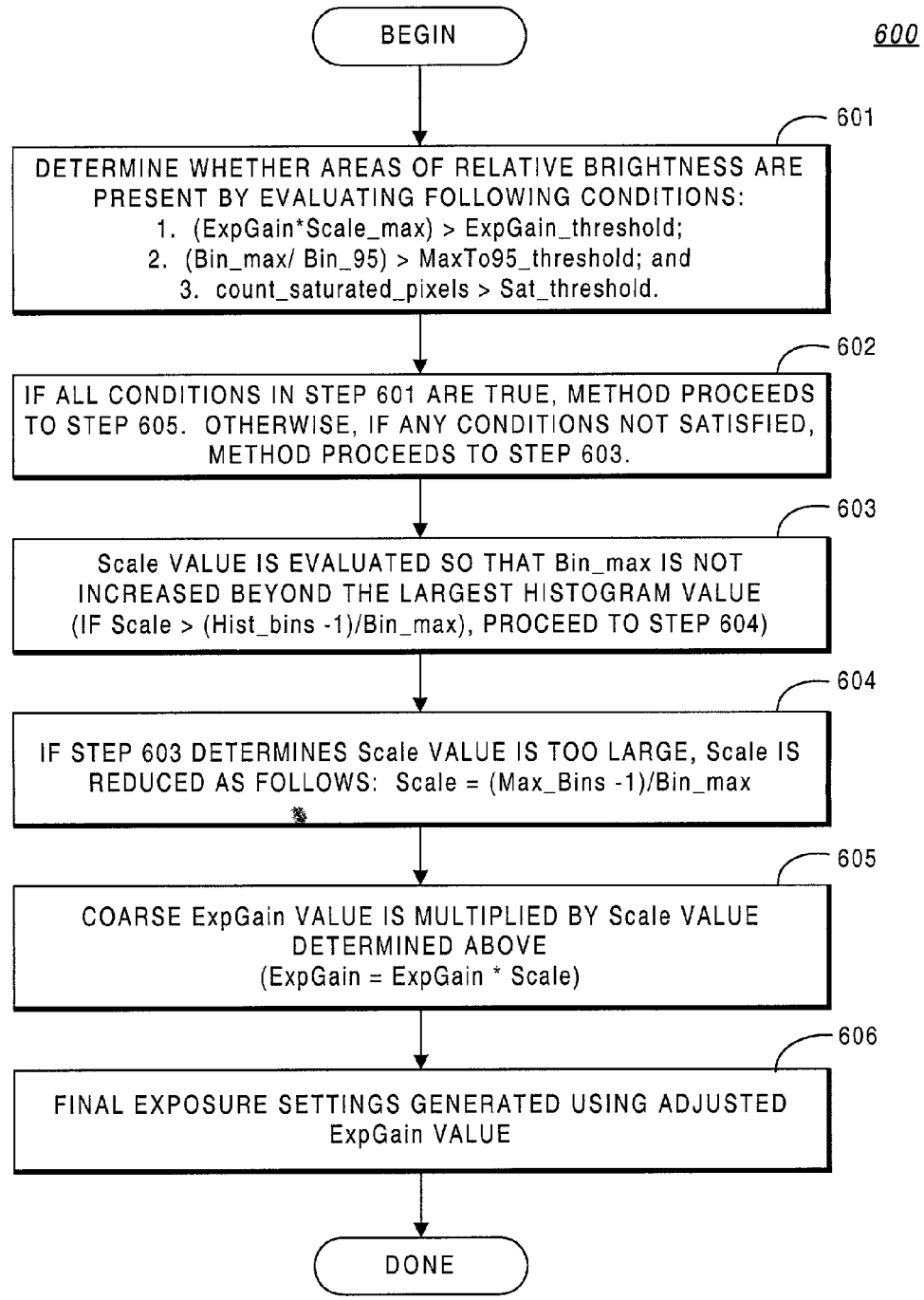
FIG. 6 is a flowchart illustrating the detailed method steps of the fine phase of the autoexposure method of the present invention.

FIG. 6 is a flowchart illustrating the detailed method steps of the fine phase of the autoexposure method of the present invention. As described above, the fine phase adjusts the exposure settings generated during the coarse phase of the process based upon a determination about whether or not the scene has areas of relative brightness (e.g., overhead lights). Accordingly, at step 601, the fine phase commences with an evaluation as to whether or not areas of relative brightness are present in a scene. Image information and parameters computed (e.g., ExpGain, Bin_95, Bin_max, etc.) during the coarse phase are utilized during fine phase calculations. The presence of light sources (i.e., areas of brightness) is assumed if all the following conditions hold true:

1. (ExpGain * Scale_max)>ExpGain_threshold;
2. (Bin_max/Bin_95)>MaxTo95_threshold; and
3. count_saturated_pixels>Sat_threshold.

As areas of relative brightness are usually present in darker scenes (which have higher ExpGain values), the first condition looks for darker scenes. For example, if the ExpGain setting is 20000 (the example value as shown in the above table), and the Scale_max value is 1.867, the product of these values (ExpGain * Scale_max) is lower than the above exemplary ExpGain_threshold value of 50000. Accordingly, in this example the first condition is not satisfied.

The second and third conditions look for the presence of areas of relative brightness in the scene. Using the same example values from the third column of the above table, Bin_max (15) divided by Bin_95 (12) is equal to 1.25. This value of 1.25 is less than the MaxTo95_threshold of 2.0 indicated above. The third condition is evaluated by comparing the count of saturated pixels (for example, a count of 5000) made during the coarse phase (count_saturated_pixels) to the saturation threshold (Sat_threshold with an example value of 10000 above). In this example, count_saturated_pixels is less than the saturation threshold. As shown at step 602, if all three of the above conditions hold true, the method proceeds to step 605 for calculation of the final exposure settings. However, if any of the conditions in step 601 are not satisfied (i.e., they do not hold true), then the method proceeds to step 603. Since none of the three conditions are satisfied in this example, the method would proceed to step 603 for adjustment of coarse exposure settings.

In step 603, the Scale value is evaluated so that the method does not scale Bin_max (i.e., the 99.5 percentile bin) beyond the largest histogram bin (e.g., bin 31 in a histogram from bin 0 to bin 31). The Scale value determined as set forth above is compared to the number of bins in the histogram divided by the Bin_max value. If Scale is greater than the number of bins divided by Bin_max (i.e., if (Scale> ((Hist_Bins_1)/Bin_max)), the method proceeds to step 604 for adjustment of the Scale value. Otherwise, Scale is not adjusted and the method proceeds instead to step 605. These calculations may be illustrated by the following example, which is based upon the example values set forth in the above table. The example Scale value of 1.867 is compared to the number of bins in the histogram (Hist_Bins value of 32 minus 1) divided by the Bin_max value (15 in this example). In this case, the Scale value of 1.867 is less than 2.067 (31 divided by 15). Accordingly, the Scale value of 1.867 does not need to be adjusted as it will not scale Bin_max beyond the largest histogram value and the method may proceed to step 605.

On the other hand, if the evaluation in step 603 determines that the Scale value would shift the histogram too far towards overexposure (i.e., Scale is greater than (Hist_Bins− 1)/Bin_max), the Scale value would be limited in step 604 in order to preserve highlights in an image. The following adjustment would be made to the Scale value in this situation: Scale=(Hist_Bins-1)/Bin_max. For instance, if the Bin_ max value were 20, the Scale value would be equal to 1.55 (31 divided by 20). This adjustment serves to reduce the final ExpGain value that will be used for final exposure of the image.

After the appropriate Scale value has been determined through the above steps, the final exposure settings may be computed. At step 605, the final ExpGain value is determined by multiplying ExpGain by Scale. As shown, the final ExpGain setting is equal to the coarse ExpGain value multiplied by the Scale parameter (i.e., ExpGain=ExpGain * Scale). As described in the above table, Scale is equal to the greater of Scale_95 or Scale_max. In this example, the Scale_max setting of 1.867 (as shown in column 3 of the above table opposite Scale) is used to determine the final ExpGain value. At step 606, the adjusted ExpGain value determined as a result of this fine phase may then be used to generate final exposure time and sensor gain settings for capture of an image on the digital camera's image sensor. The mapping of the final ExpGain value to particular exposure time and sensor gain settings for taking a final exposure is described in greater detail below.

H. Mapping ExpGain to Exposure Time and Sensor Gain

Figure 7:
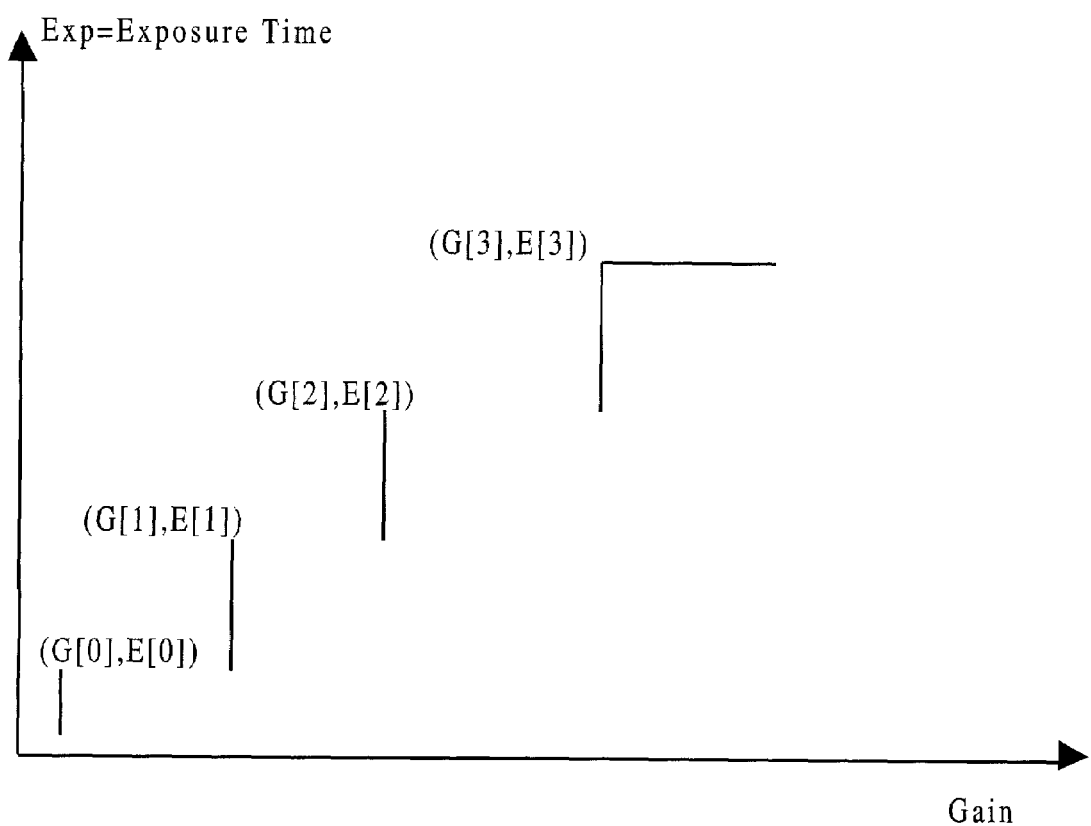
FIG. 7 is a graph showing how ExpGain is mapped to exposure time and sensor gain for coarse phase autoexposure.

During the coarse phase of the autoexposure method of the present invention, speed of processing is preferred over image quality of the captured image as the captured image data is discarded at the end of the coarse phase in any event. In order to speed up processing during the coarse phase, high sensor gains are used. FIG. 7 is a graph illustrating the manner in which ExpGain is mapped to particular exposure time (Exp) and sensor gain (Gain) settings during the coarse phase. As shown, a piecewise constant curve is mapped that is defined by arrays E [N], that represents exposure time (Exp) and G [N], that represents sensor gain (Gain). The curve is defined so that it is monotonically increasing. For a given ExpGain value, NO is determined so that E [NO] *G [NO] just exceeds ExpGain as follows:

Gain=G[NO];

Exp=ExpGain / Exp;

As previously described, the ExpGain value used during the coarse phase may be an initial setting (either pre-selected or based upon the most recent picture taken) or may result from feedback received during a prior iteration.

Figure 8:
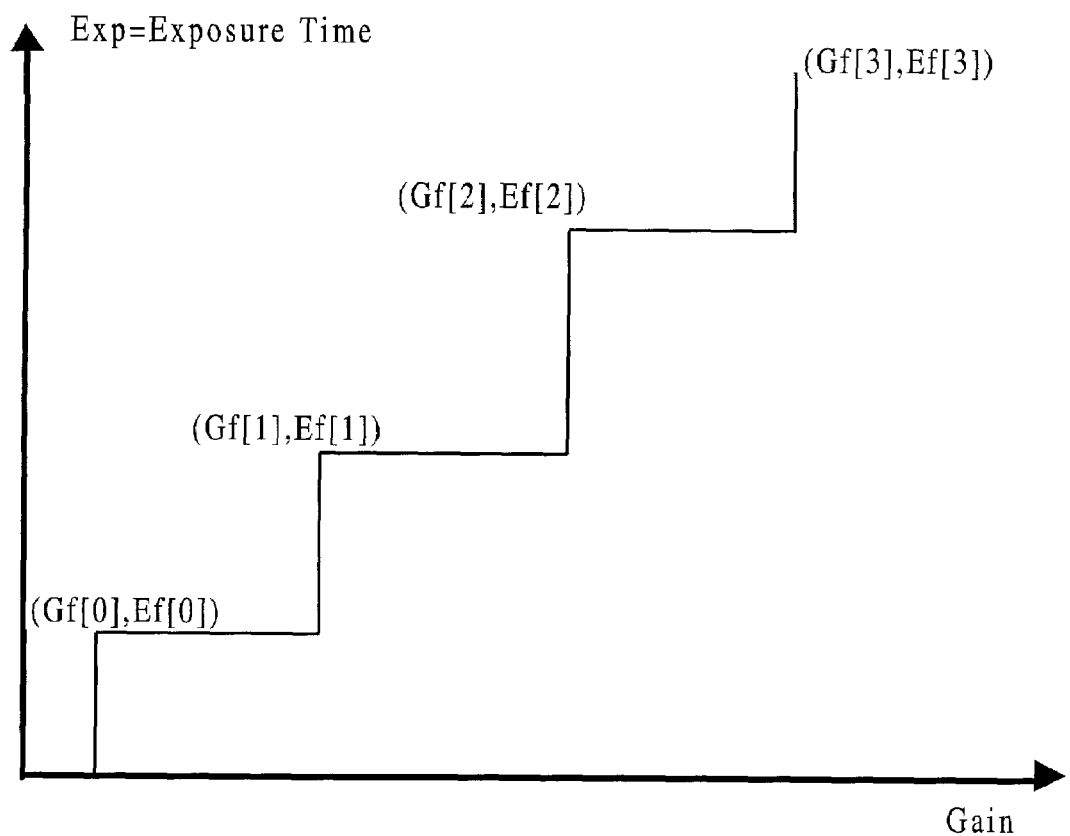
FIG. 8 is a graph showing how ExpGain is mapped to exposure time and sensor gain for final exposure of an image.

FIG. 8 illustrates the mapping of the final ExpGain value to the exposure and gain settings to be used for final exposure of an image. As shown at FIG. 8, a piecewise constant curve that is defined by arrays Ef [N], that represents exposure time (Exp) and Gf [N] that represents sensor gain (Gain) is used for final exposure. The curve is defined so that it is monotonically increasing. For a given ExpGain, NO is determined so that Ef [NO] *Gf [NO] just exceeds ExpGain as follows:

```
If (ExpGain > Ef [N0 − 1] * Gf [N0] )
{
    Gain = Gf [N0] ;
    Exp = ExpGain/Gain;
}
else
{
    Exp = Ef [N0 − 1] ;
    Gain = ExpGain/Exp;
}
```

This formula used during final exposure represents a finer computation than for the coarse phase, but the extra processing step is justified because this calculation determines the final exposure time and gain settings before the picture destined for compression and storage is captured.

I. Alternative Embodiment

As previously noted, in the preferred embodiment the digital camera has only an optical viewfinder and does not utilize a Direct View Display. However, the present invention is also useful in a camera which includes a Direct View Display enabling a user to view the scene being captured. A Direct View Display enables a digital camera device to continuously capture preview images (frames), thereby providing an opportunity to revise exposure control settings continuously (per frame). In this context, the autoexposure method of the present invention can be used to jumpstart or bootstrap the display by determining correct exposure settings for the first preview frame. Similarly, the present autoexposure method may also be used to start the automatic exposure control method on a digital camera having a Direct View Display.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for automatic exposure control at a digital camera device, the method comprising:
   in response to user input requesting capture of a digital image at a digital camera device, capturing image data on an image sensor, said image data including values of brightness of pixels of said image sensor;
   profiling distribution of said values of brightness;
   generating at least one initial exposure setting for capture of said digital image, said at least one initial exposure setting based upon scaling distribution of said values of brightness towards the midpoint of a pre-selected interval;
   evaluating said image data parameters to determine whether areas of relative brightness are present; and
   generating at least one final exposure setting using piecewise constant curves by scaling said at least one initial exposure setting based upon whether areas of relative brightness are determined to be present.

2. The method of claim 1, further comprising: capturing a digital image using said at least one final exposure setting.

3. The method of claim 1, wherein said step of profiling distribution of said values of brightness includes generating a histogram of said values of brightness.

4. The method of claim 3, wherein said histogram is generated based upon counts of said values of brightness in pre-selected ranges.

5. The method of claim 3, wherein said step of scaling said initial exposure setting includes not scaling said histogram beyond the largest histogram value in the event areas of relative brightness are determined not be present.

6. The method of claim 1, wherein said digital camera device has a fixed lens aperture.

7. The method of claim 1, wherein said digital camera device does not include a flash device.

8. The method of claim 1, wherein said digital camera does not include an external light sensor.

9. The method of claim 1, wherein said step of capturing image data includes capturing image data using pre-selected exposure settings.

10. The method of claim 9, wherein said pre-selected exposure settings comprise the exposure settings used for capture of a prior image on said digital camera device.

11. The method of claim 1, wherein said at least one final exposure setting includes at least one of exposure time and sensor gain.

12. The method of claim 1, further comprising:
    counting saturated pixels; and
    reducing at least one of exposure time and sensor gain in the event said count of saturated pixels exceeds a pre-selected maximum.

13. The method of claim 1, wherein step of evaluating said image data to determine whether areas of relative brightness are present includes determining whether light sources are present.

14. The method of claim 1, wherein step of capturing image data on an image sensor includes using relatively high sensor gain values.

15. The method of claim 1, said step of generating at least one final exposure setting includes using relatively low sensor gain values.

16. The method of claim 1, wherein said step of determining whether areas of relative brightness are present includes determining whether a count of pixels with high brightness values exceeds a pre-selected maximum.

17. The method of claim 1, wherein said step of determining whether areas of relative brightness are present includes determining whether said at least one initial exposure setting exceeds an established threshold.

18. The method of claim 1, further comprising:
    using said at least one final exposure setting to generate an initial image on a direct view display of a digital camera.

19. A method for automatic exposure control for a digital camera device, the method comprising:
    receiving user input requesting capture of a digital image at a digital camera device;
    in response to said user input, capturing image data including luminosity values of pixels of an image sensor of said digital camera device;
    generating a profile of said luminosity values including mapping said luminosity values into a histogram, wherein mapping said luminosity values into a histogram includes mapping at least 256 luminosity values into at least 8 pre-selected ranges;
    determining an initial exposure solution for exposure of a digital image based upon scaling said profile of said luminosity values towards the mid-point of a pre-selected interval;
    counting pixels with high luminosity values to determine whether areas of relatively high luminosity values are present; and
    generating a final exposure solution by scaling said initial exposure solution based upon whether areas of relatively high luminosity values are determined to be present.

20. The method of claim 19, further comprising:
    capturing a digital image using said final exposure solution.

21. The method of claim 19, wherein said step of generating a profile of said luminosity values includes generating a histogram of said luminosity values.

22. The method of claim 19, wherein said step of generating a final exposure solution includes using piecewise constant curves.

23. The method of claim 19, wherein said step of capturing image data on pixels of an image sensor includes using relatively high sensor gain values.

24. The method of claim 19, wherein said step of scaling said initial exposure solution includes reducing at least one of exposure time and sensor gain in the event areas of relatively high luminosity values are determined not to be present.

25. The method of claim 19, wherein said digital camera device has a fixed lens aperture.

26. The method of claim 19, wherein said digital camera device does not include a flash device.

27. The method of claim 19, wherein said digital camera does not include an external light sensor.

28. The method of claim 19, wherein said step of capturing image data includes capturing image data using pre-selected exposure settings.

29. The method of claim 19, further comprising:
counting saturated pixels in said image data; and
if said count of saturated pixels exceeds a pre-selected maximum, adjusting said initial exposure solution to avoid over saturation.

30. The method of claim 19, further comprising:
using said final exposure solution to generate an initial image on a direct view display of a digital camera.

31. The method of claim 19, further comprising:
using said final exposure solution to start a direct view display automatic exposure control process on a digital camera having a direct view display.

32. A method for automatic exposure control for a digital camera, the method comprising:
generating an initial exposure solution for capture of an image on a digital camera by iteratively performing the substeps of:
capturing values of brightness of pixels on an image sensor of a digital camera using an initial exposure solution;
determining whether distribution of said values of brightness is within a pre-selected range;
if distribution of said values of brightness is determined not to be within said pre-selected range, adjusting said initial exposure solution by scaling distribution of said values of brightness towards the mid-point of said pre-selected range;
if distribution of said values of brightness is determined to be within said pre-selected range, generating a final exposure solution using piecewise constant curves by performing the substeps of:
evaluating said values of brightness to determine whether areas of relatively high brightness values are present; and
scaling said initial exposure solution based upon whether areas of relatively high brightness values are determined to be present.

33. The method of claim 32, wherein said substep of capturing values of brightness using an initial exposure solution includes using relatively high sensor gains to decrease exposure time.

34. The method of claim 32, wherein said step of generating an initial exposure solution continues until distribution of said values of brightness is determined to be within said pre-selected range.

35. The method of claim 32, wherein said substep of determining whether distribution of said values of brightness is within a pre-selected range includes evaluating whether an image is overexposed.

36. The method of claim 32, wherein said substep of determining whether distribution of said values of brightness is within a pre-selected range includes evaluating whether an image is underexposed.

37. The method of claim 32, wherein said initial exposure solution comprises a product of exposure time and sensor gain.

38. The method of claim 32, wherein said step of generating an initial exposure solution further comprises the substeps of:
counting pixels with high brightness values; and
if said count of pixels with high brightness values exceeds a pre-selected maximum, scaling said initial exposure solution to avoid over saturation.

39. The method of claim 32, wherein said final exposure solution comprises specific exposure time and sensor gain values.

40. The method of claim 32, wherein said step of generating a final exposure solution includes using lower sensor gain values to improve image quality.

41. The method of claim 32, wherein said digital camera device has a fixed lens aperture.

42. The method of claim 32, wherein said digital camera device does not include a flash device.

43. The method of claim 32, wherein said digital camera does not include an external light sensor.

44. The method of claim 32, wherein said substep of evaluating said values of brightness to determine whether areas of relatively high brightness values are present includes determining whether a count of pixels with high brightness values exceeds a pre-selected maximum.

45. The method of claim 32, further comprising:
mapping said final exposure solution to specific exposure time and sensor gain settings.

46. The method of claim 45, wherein said step of mapping said fine exposure settings to exposure time and sensor gain values includes mapping using piecewise constant curves.

47. The method of claim 45, further comprising:
capturing an image on said digital camera using said exposure time and sensor gain settings.

48. The method of claim 32, further comprising:
using said final exposure solution to generate an initial image on a direct view display of a digital camera.

49. The method of claim 32, further comprising:
using said final exposure solution for starting an automatic exposure method on a digital camera having a direct view display.

* * * * *